(12) United States Patent
Tateishi et al.

(10) Patent No.: US 6,970,405 B2
(45) Date of Patent: Nov. 29, 2005

(54) OPTICAL RECORDING/REPRODUCING APPARATUS

(75) Inventors: Kiyoshi Tateishi, Tsurugashima (JP); Kazuo Takahashi, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 394 days.

(21) Appl. No.: 10/142,958

(22) Filed: May 13, 2002

(65) Prior Publication Data

US 2002/0172110 A1    Nov. 21, 2002

(30) Foreign Application Priority Data

May 15, 2001   (JP) .............................. 2001-144769

(51) Int. Cl.[7] ............................................. G11B 7/095
(52) U.S. Cl. ................... 369/44.32; 369/53.19
(58) Field of Search ........................... 369/44.32, 53.19

(56) References Cited

U.S. PATENT DOCUMENTS 5,848,036 A * 12/1998 Ishibashi et al. ......... 369/44.29
5,953,296 A *  9/1999 Baba ....................... 369/44.32
6,628,589 B2 *  9/2003 Iwasaki et al. .......... 369/53.19
6,757,227 B2 *  6/2004 Kumagai et al. ........ 369/44.37
6,785,209 B2 *  8/2004 Chung et al. ............ 369/53.19

FOREIGN PATENT DOCUMENTS

| JP | 08-030975 | 2/1996 |
| JP | 10-106012 | 4/1998 |
| JP | 10-269611 | 10/1998 |
| JP | 2000-131603 | 5/2000 |

\* cited by examiner

*Primary Examiner*—A M Psitos
(74) *Attorney, Agent, or Firm*—Morgan, Lewis & Bockius LLP

(57) ABSTRACT

A recording/reproducing apparatus includes an optical pickup having an objective lens, an actuator for operating the lens, an aberration correction element, and a detector for generating a reading signal; a servo control section; a driver for operating the aberration correction element; a generator for generating a focus disturbance signal and an aberration correction disturbance signal having a period different from that of the focus disturbance signal; and a controller for adjusting the focusing position and the aberration correction amount on the basis of a change in a predetermined characteristic value of the reading signal when the disturbance signals are simultaneously applied.

12 Claims, 13 Drawing Sheets

TWO-DIMENSIONAL 8-DIRECTION SEARCH

TWO-DIMENSIONAL 4-DIRECTION SEARCH

OPTICAL RECORDING/REPRODUCING APPARATUS

BACKGROUND OF THE INVENTION

1. Field of the Invention

The present invention relates to a recording and/or reproducing apparatus (hereinafter, referred to as recording/reproducing apparatus) of an optical recording medium, and particularly to a recording/reproducing apparatus having a controller for a focus servo, a tracking servo and an aberration correction.

2. Description of the Related Art

Optical discs such as a CD (Compact Disc) and a DVD (Digital Video Disc or Digital Versatile Disc) are well known as information recording media for optically recording and reproducing information. Furthermore, there are various types of optical discs, for example, an optical disc for reproduction only, a write-once optical disc on which only additional recording can be done, and a rewritable optical disc on which information can be erased and re-recorded. Research and development are in progress for developing high-density optical discs and an optical pickup device and an information recording and/or reproducing apparatus applicable to the high-density optical discs.

It is considered to irradiate a light beam having a smaller irradiating diameter to the optical disc by increasing the numerical aperture (NA) of an objective lens provided in the optical pickup device so as to cope with the increase in recording density of the optical disc. Further, the light beam having a shorter wavelength is used to cope with the recording density increase.

However, aberration of the light beam caused by an optical disc is increased as the numerical aperture NA of the objective lens is increased or a light beam having a shorter wavelength is used. This makes it difficult to improve performance accuracy of the recording/reproduction of information.

For example, when an objective lens having a large numerical aperture is used, the amount of birefringence distribution, which depends on the incidence angle, is increased at the pupil surface of the optical disc, since the range of the incidence angle of the light beam to the optical disc is increased. This creates a problem that an aberration due to the birefringence becomes more influential. In addition, the adverse effect of aberration increases due to a thickness error of a disc cover layer for protecting the disc recording surface.

Such an aberration correction apparatus is disclosed, for example, in Japanese Patent Laid-Open Publication Kokai No. 2000-131603. The apparatus includes two groups of lenses (or beam expander) to correct spherical aberration of the light beam produced at the optical disc by varying a distance between the lenses along an optical axis of the light beam. Another aberration correction apparatus disclosed in Japanese Patent Laid-Open Publication Kokai No. H10-106012. The apparatus includes a beam expander for varying the beam diameter of the light beam. The beam expander is moved along the optical axis of the light beam to correct the spherical aberration.

As another conventional technique for reducing the aforementioned aberration, an optical pick-up device having a liquid crystal element for aberration correction is proposed. An example of such aberration correction element is disclosed in Japanese Patent Laid-Open Publication Kokai No. H10-269611. The aberration correction element includes a plurality of phase adjustment portions formed concentrically. The phase adjustment portions are applied with predetermined voltages to adjust orientation of the liquid crystal molecules. Thus, the aberration of the light beam can be corrected.

It is necessary to optimize a focusing adjustment and an aberration correction to perform a preferable recording or reproducing operation. The focusing adjustment and the aberration correction are generally performed by detecting a focus error and the aberration of the light beam by using a reading signal (RF signal) from the optical disc. The adjustment and the correction are performed in accordance with the amounts of the focus error and the aberration. An example of such focus control is disclosed in Japanese Patent Laid-Open Publication Kokai No. H8-30975.

However, when the high NA objective lens is used as mentioned above and the aberration correction element is operated so as to optimize the aberration correction, a focus adjusting value is deviated from an optimum value. Otherwise, when the focus adjusting value is controlled so as to be optimum, the aberration correction is deviated from an optimum value. Accordingly, there is a problem that it is difficult to optimize both the focus control and the aberration correction. In other words, there is a problem that the optimization of an entire system cannot be achieved by the individual adjustment or correction of the parameter values.

OBJECT AND SUMMARY OF THE INVENTION

The present invention has been made to overcome the above-described problems, and it is an object of the present invention to provide a high performance recording/reproducing apparatus which is capable of optimizing both a focus adjustment and an aberration correction.

To achieve the object, according to one aspect of the present invention, there is provided a recording/reproducing apparatus for recording and/or reproducing information data by irradiating a light beam to a recording medium, which comprises an optical pickup including an objective lens for converging the light beam, an actuator for operating the objective lens, an aberration correction element for correcting aberration caused in the reflected light beam, and a detector for generating a reading signal by receiving the reflected light beam from the recording medium; a servo control section for performing focus servo control by operating the actuator; an aberration correction driver for performing the aberration correction by operating the aberration correction element; a disturbance signal generator for generating a focus disturbance signal for wobbling a focusing position of the objective lens, and an aberration correction disturbance signal having a period different from that of the focus disturbance signal and wobbling an aberration correction amount of the aberration correction element; and a controller for adjusting the focusing position and the aberration correction amount on the basis of a change in a predetermined characteristic value of the reading signal when the focus disturbance signal and the aberration correction disturbance signal are simultaneously applied.

According to another aspect of the present invention, there is provided a recording/reproducing apparatus for recording and/or reproducing information data by irradiating a light beam to a recording medium, an optical pickup including an objective lens for converging the light beam, an actuator for operating the objective lens, an aberration correction element for correcting aberration caused in the reflected light beam, and a detector for generating a reading signal by receiving the reflected light beam from the recording medium; a servo control section for performing focus servo control by operating the actuator; an aberration correction driver for performing the aberration correction by operating the aberration correction element; a disturbance signal generator for generating a focus disturbance signal for wobbling a focusing position of the objective lens, and an aberration correction disturbance signal for wobbling a correcting amount of the aberration correction element; a calculator for obtaining a predetermined characteristic value of the reading signal while the focus disturbance signal and the aberration correction disturbance signal are simultaneously or alternately applied, to calculate each of changing values for the focusing position and the correcting amount on the basis of a change in the obtained characteristic value; and a controller for simultaneously or alternately changing the focusing position and the correcting amount in accordance with each of the changing values to control the predetermined characteristic value so as to be an optimum value.

DETAILED DESCRIPTION OF THE PREFERRED EMBODIMENT

Figure 1:
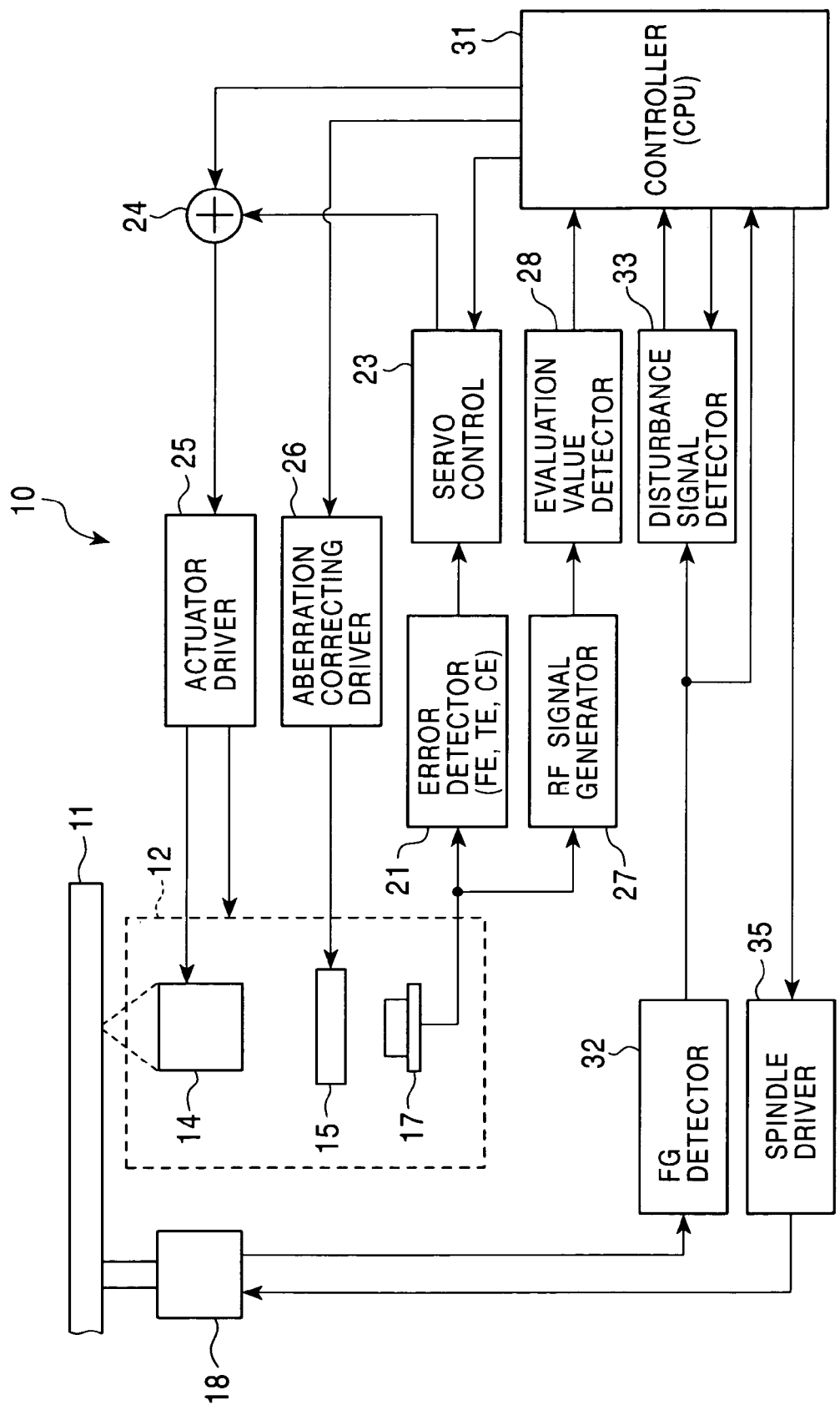
FIG. 1 is a block diagram showing the configuration of a recording/reproducing apparatus according to a first embodiment of the present invention.

The embodiments of the present invention will be described in detail with reference to the drawings. In the figures used in the following explanation, substantially equivalent elements are designated by identical reference numerals.

First Embodiment

FIG. 1 is a block diagram showing the configuration of a recording/reproducing apparatus 10 according to a first embodiment of the present invention.

A laser beam source (not shown) provided in an optical pickup device 12 emits a laser beam having a wavelength λ of e.g., 405 nm. The light beam emitted from the laser source is converted to a parallel light beam, and is converged by an objective lens 14 to be irradiated to an optical disc 11. The irradiated light beam is reflected from the optical disc 11 and is converged by the objective lens 14 to be detected by a photo detector 17 via an aberration correction unit 15. The optical disc 11 is rotated by a spindle motor 18.

The reflected light is converted to an electric signal by the photo detector 17. The detection signal is supplied to an error detecting circuit 21 to generate error signals such as a focus error signal (FE), a tracking error signal (TE) and a tilt error signal (CE). The error signals (FE, TE, CE) are supplied to a servo control section 23 to be compensated in phase. A control signal from the servo control section 23 and a disturbance signal supplied from a controller 31 are supplied to an actuator driver 25 via an adder 24. The actuator driver 25 sends a driving signal to an actuator (not shown) arranged in the optical pickup 12 to operate the optical pickup 12. The servo control section 23 operates the actuator with the error signals to drive the objective lens 14 and the optical pickup 12 so that a servo loop of focusing, tracking, tilt control is formed to execute servo control.

The aberration correction unit 15 changes an amount of aberration correction (i.e., aberration correction value) in response to a driving signal from an aberration correction driver 26 to execute the aberration correction. The aberration correction unit 15 includes the beam expander, alternatively, other various elements such as an aberration correction element having a liquid crystal element can be also used in the aberration correction unit 15.

A detection signal from the photo detector 17 is supplied to an RF signal generating circuit 27 so that a reading RF signal (hereinafter also simply called a reading signal) is generated. An evaluation value detecting circuit 28 detects a predetermined characteristic value of the reading RF signal as an evaluation value described later. The reading signal includes a reading RF signal, a signal from prepits provided on a predetermined position of the disc, a wobble signal from a tracking guide groove, a tracking error signal, etc. A characteristic value such as an amplitude amount, a jitter amount or an error rate amount of one or more of these signals can be used as the evaluation value. In the following description, a case in which an envelope signal amplitude (hereinafter also simply called an envelope amplitude) of the reading RF signal is used as the evaluation value will be described as an example.

The envelope amplitude detected in the evaluation value detecting circuit 28 is converted to a digital value by an analog/digital (A/D) converter (not shown) arranged in the evaluation value detecting circuit 28, and is supplied to the controller 31. The controller 31 controls operations of the servo control section 23 and the aberration correction driver 26 on the basis of the envelope amplitude. The controller 31 is a digital signal processing circuit including a ROM (Read Only Memory), a RAM (Random Access Memory) and a DSP (Digital Signal Processor). The controller 31 also includes an digital/analog (D/A) converter (not shown) and a analog signal processing circuit for converting generated digital signals, e.g., an aberration correction signal and an actuator driving signal to analog signals so as to respectively supply the signals to the aberration correction driver 26 and the actuator driver 25.

An FG pulse signal corresponding to a spindle rotation angle of the spindle motor 18 is generated in an FG pulse detecting circuit 32. The FG pulse signal is supplied to a disturbance signal generating circuit 33 and the controller 31. The disturbance signal generating circuit 33 generates a focus disturbance signal, a tracking disturbance signal and a tilt disturbance signal for respectively wobbling a focusing position of the objective lens, a tracking position and a tilt angle under control of the controller 31, and also generates an aberration correction disturbance signal for wobbling a correcting amount of the aberration correction unit 15. The generated aberration correction disturbance signal is supplied to the controller 31, and the controller 31 applies (i.e., superposes) the aberration correction disturbance signal to an analog aberration correction signal sent to the aberration correction driver 26. The generated focus disturbance signal, etc. are applied (superposed) to an analog actuator-driving signal from the servo control section 23 in the adder 24, and are supplied to the actuator driver 25.

The controller 31 controls the operation of a spindle driver 35 on the basis of a prepit signal in a detection signal of the photo detector 17 and a wobble signal or an FG signal from a track groove formed with wobbling to adjust the spindle rotating speed of the spindle motor 18.

The servo control section 23 may be constructed by a servo control circuit generally used. Each circuit block is not limited to a digital circuit, but may be constructed by an analog circuit. Further, the controller 31 may be also provided as a microprocessor (CPU), an individual circuit block, software, a firmware or a combination of these.

Figure 2:
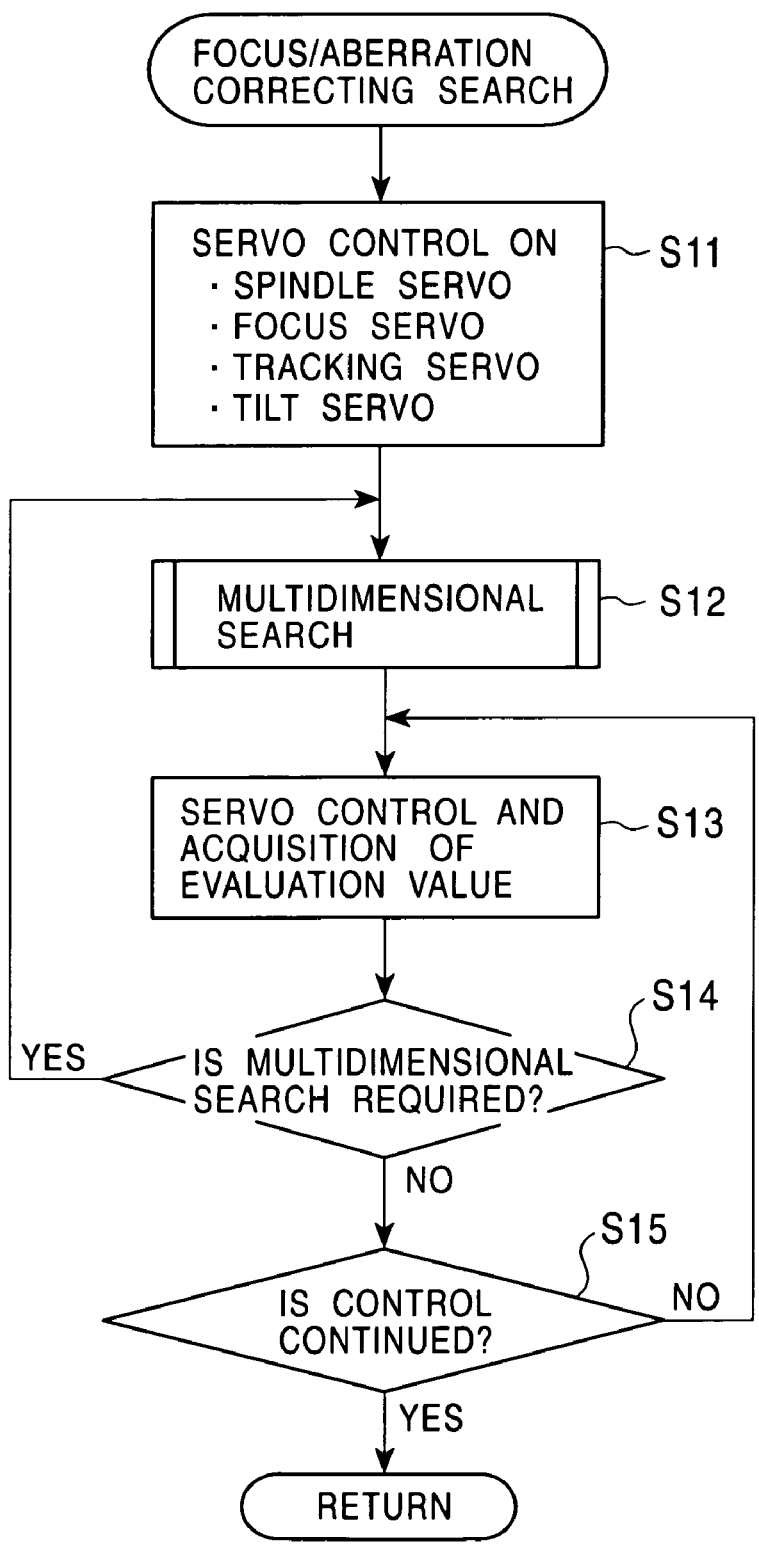
FIG. 2 is a flow chart showing a control operating procedure of a focus/aberration correction.
Figure 3:
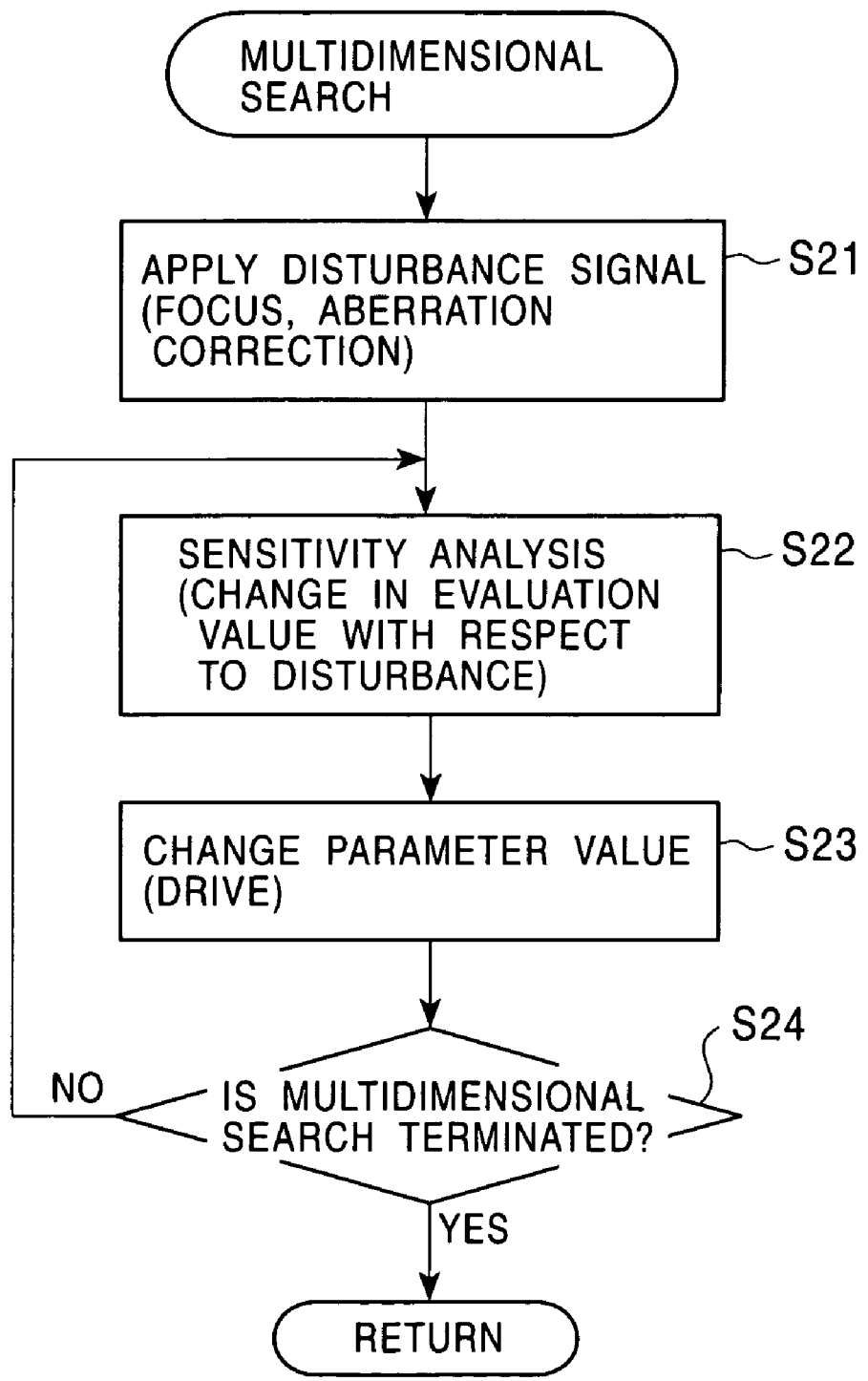
FIG. 3 is a flow chart showing the procedure of a multidimensional search.

A control operation of the focus/aberration correction of the recording/reproducing apparatus 10 will be described in detail with reference to flowcharts shown in FIGS. 2 and 3. In the following description, an operation for optimizing control parameters including the aberration correction amount and the focus position is called a "search". Further, for brevity of the explanation, a case for making the aberration correction and the focus search will be described as an example.

Such a focus/aberration correction search is executed during a recording or reproducing operation of the recording/reproducing apparatus 10 while an evaluation value described later is monitored. When the recording or reproducing operation is started, servo control including controls of a focus servo, a tracking servo, a tilt servo, a sled servo, a spindle servo is started (ON) as shown in FIG. 2 (step S11). Then, a focus/aberration correction search routine (step S12) in multiple dimensions is executed. A procedure of such a multidimensional search is shown in the flow chart of FIG. 3.

Figure 4:
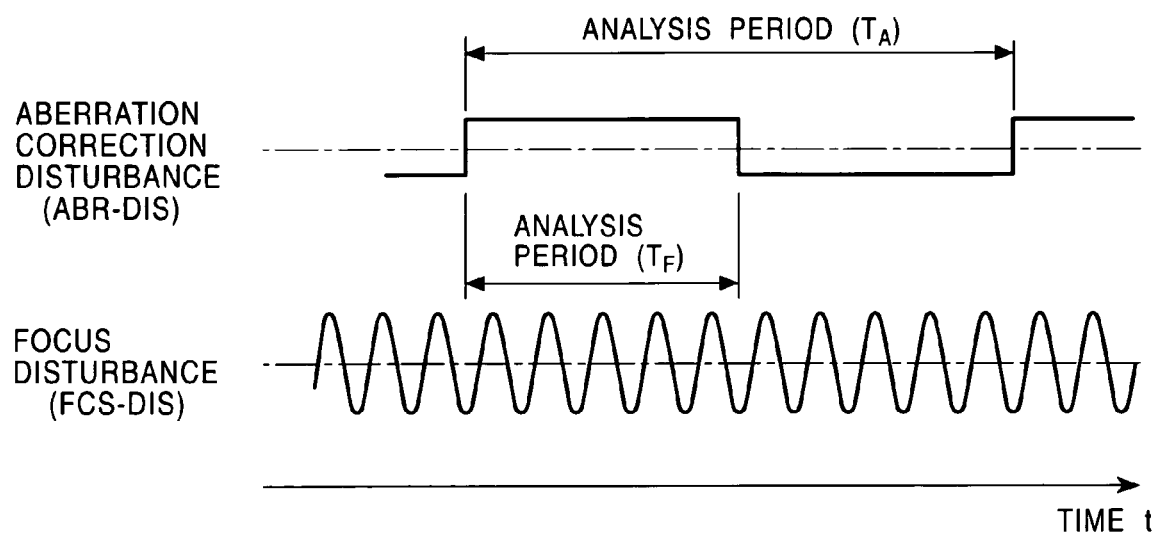
FIG. 4 is a view showing a focus disturbance signal (FCS-DIS) and an aberration correction disturbance signal (ABR-DIS) as one example of disturbance signals.

A generated focus disturbance signal (FCS-DIS) is supplied to the actuator driver 25 for operating the objective lens 14 under control of the controller 31, and the focusing position of the objective lens 14 is wobbled. In parallel with this operation, an aberration correction disturbance signal (ABR-DIS) is also supplied to the aberration correction driver 26 and the aberration correction amount is wobbled (step S21). Each of the disturbance signals varies in accordance with the structures of a used actuator and an aberration correction unit and control characteristics. FIG. 4 shows one example of such disturbance signals.

It is suitable for a sensitivity analysis described later to perform wobbling at a comparatively low frequency (wobbling frequency) when using an aberration correction unit having a beam expander. As shown in FIG. 4, for example, a binary rectangular wave signal synchronized with a rotating frequency of the optical disc 11, i.e., a DC-like step signal is applied as the aberration correction disturbance signal (ABR-DIS). More particularly, when a rotation speed of the optical disc 11 is set to 20 to 40 rotation/second, the wobbling frequency is set to 10 to 20 Hz half the rotation speed. An aberration correction analysis period ($T_A$) in the sensitivity analysis corresponds to two rotations of the optical disc 11, and the aberration correction amount is changed every two rotations. It is possible to remove the influence of a fluctuation component (e.g., due to a defect such as a fault of the disc) in accordance with the rotation of the optical disc 11 by selecting the analysis period in this manner.

With respect to the focus position, it is possible to use a comparatively high wobbling frequency equal to or lower than a focus servo frequency band (e.g., several kHz) since the wobbling can be performed with focus servo being in a closed state. As shown in FIG. 4, for example, a 200 Hz sine wave is applied as the focus disturbance signal (FCS-DIS). As mentioned above, the focus disturbance signal (FCS-DIS) is applied simultaneously with the aberration correction disturbance signal (ABR-DIS). In this embodiment, the analysis period ($T_F$) of the focus position is set within a period during which the aberration correction disturbance signal (ABR-DIS) is constant. However, in general, it is not necessary to set the analysis period ($T_F$) within the period during which the aberration correction disturbance signal (ABR-DIS) is constant. The analysis period ($T_F$) can be set such that the period is sufficient for suitably executing the sensitivity analysis in accordance with a shape of the aberration correction disturbance signal (ABR-DIS).

The wobbling is performed at any time in this embodiment. Therefore, when the amplitude of the above disturbance signal (ABR-DIS, FCS-DIS) is large, it exerts an influence on a reproducing signal. In contrast, when the amplitude is small, a signal-to-noise ratio (S/N) of the reproducing signal is reduced. Accordingly, a suitable amplitude must be selected. For example, the disturbance signal is applied such that the beam expander amplitude ranges from 30 to 40 $\mu$m and the focus position amplitude approximately ranges from 0.04 to 0.05 $\mu$m. However, the amplitudes are not limited to these values. It has been confirmed that there is no significant influence on a jitter amount.

Optimal control is performed such that an evaluation function including a plurality of parameters is maximized (or minimized) by controlling the plurality of parameters. In this embodiment, the plurality of parameters are set to the focus position and the aberration correction amount. The evaluation function is set to be the envelope amplitude. A change amount of the evaluation function with respect to change amounts of the parameter values at the present parameter values is calculated (sensitivity analysis). The parameter values are changed to increase (or decrease) the evaluation function value.

The sensitivity analysis is made (step S22). More particularly, a change amount of the envelope amplitude (evaluation value) with respect to the application of the above disturbance signal (ABR-DIS, FCS-DIS) is calculated. Then, the drivers 25, 26 are operated on the basis of the change amount of the envelope amplitude to change the focus position and the aberration correction amount (step S23).

Figure 5:
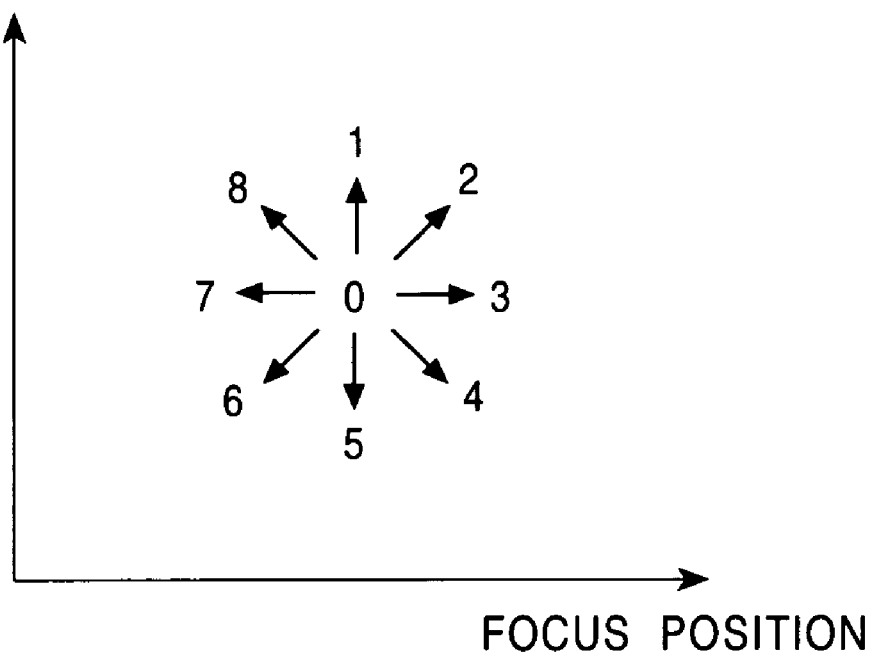
FIG. 5 is a view schematically showing a search direction (a two-dimensional 8-direction search) when a focus position and an aberration correction amount are set as parameters.

A concrete method of steps S22 to S23 will now be described in detail with reference to the drawings. FIG. 5 schematically shows a search direction when the focus position and the aberration correction amount are used as two parameters. The sensitivity analysis is simultaneously made with respect to the parameters, and the parameter values are changed on the basis of the analysis result. In this case, there are three possible directions that the respective parameter values are increased, decreased or unchanged. Accordingly, an 8-direction search (or 9-direction search when a case in which both of the parameter values are unchanged is included (shown by "0")) is set as shown by arrows 1–8 in FIG. 5. Hereinafter, the search in this case is called a "two-dimensional 8-direction search". When such a search method is used, it is necessary to detect a change in the evaluation function value with respect to each parameter disturbance independently in the sensitivity analysis.

Figure 6:
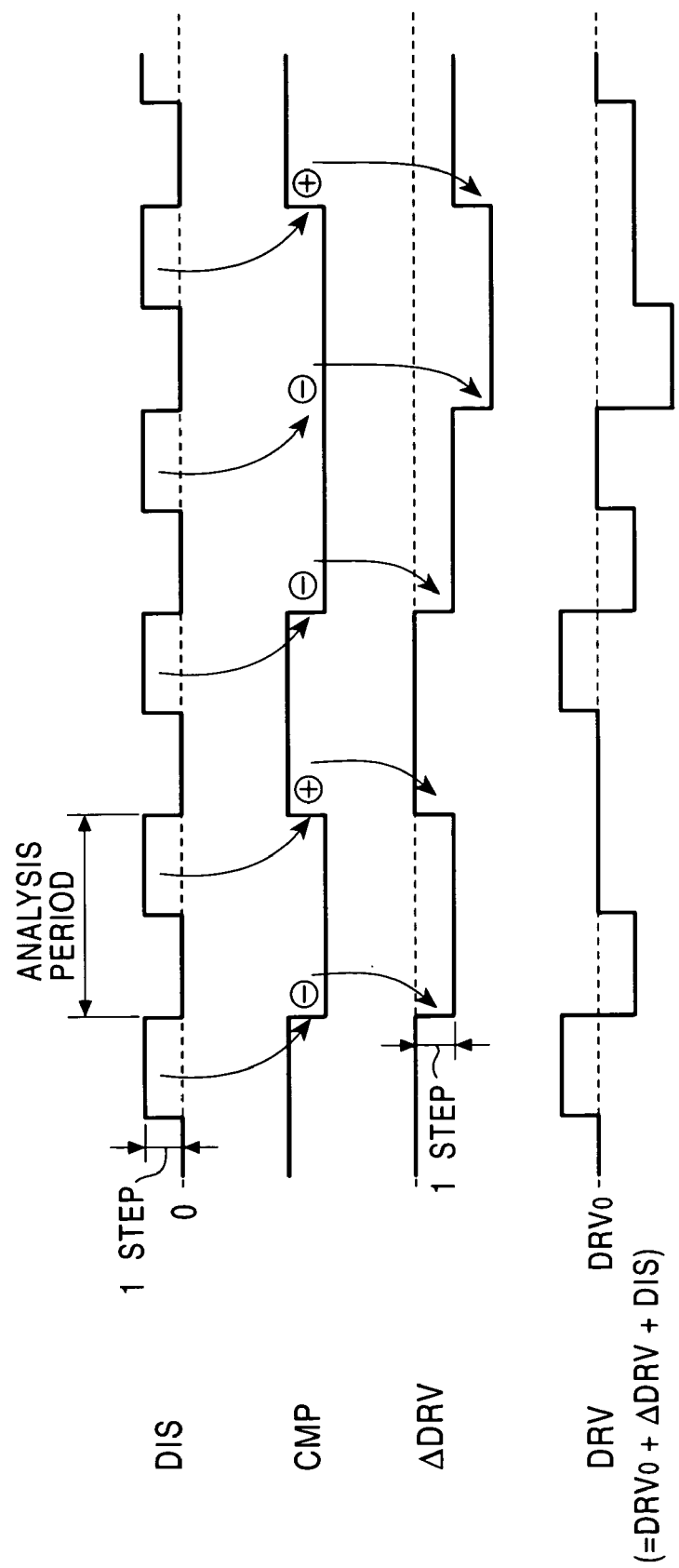
FIG. 6 is a view illustrating a sensitivity analysis and a parameter value change with respect to disturbance application.

The analysis and the parameter value change with respect to the aberration correction amount are made as follows. With reference to FIG. 6, an aberration correction disturbance (simply indicated as DIS in FIG. 6) alternately changed in value (constant) every one rotation is applied to a driving value (DRV) of the aberration correction unit 15. The envelope amplitudes in applying and unapplying periods of the disturbance are respectively integrated and the comparison result (CMP) are calculated. When the amplitude integral value is increased (i.e., CMP is plus (+)), a changing direction of the driving value (DRV) is appropriate so that the driving value is increased by a constant amount ($\Delta$DRV). On the contrary, when the CMP is reduced (i.e., CMP is minus (–)), the changing direction of the driving value (DRV) is incorrect 310 so that the driving value is decreased by a constant amount. The actual driving value (DRV) of the aberration correction unit 15 is represented by DRV=DRV$_0$+$\Delta$DRV+DIS when the driving value at a reference time point is set to DRV$_0$. FIG. 6 shows a case in which the change amounts (one step) of DIS and $\Delta$DRV are set to the same. However, these change amounts may be also set to be different from each other. For example, one step of DIS is set to be constant, and the present value of CMP is compared with its previous value and one step of $\Delta$DRV may be controlled such that the one step is changed in accordance with the change amount of the CMP value. Further, a case is described in which a direction (polarity) of the disturbance DIS is constant. However, for example, the direction may be inverted when the comparison result (CMP) is minus.

Figure 7:
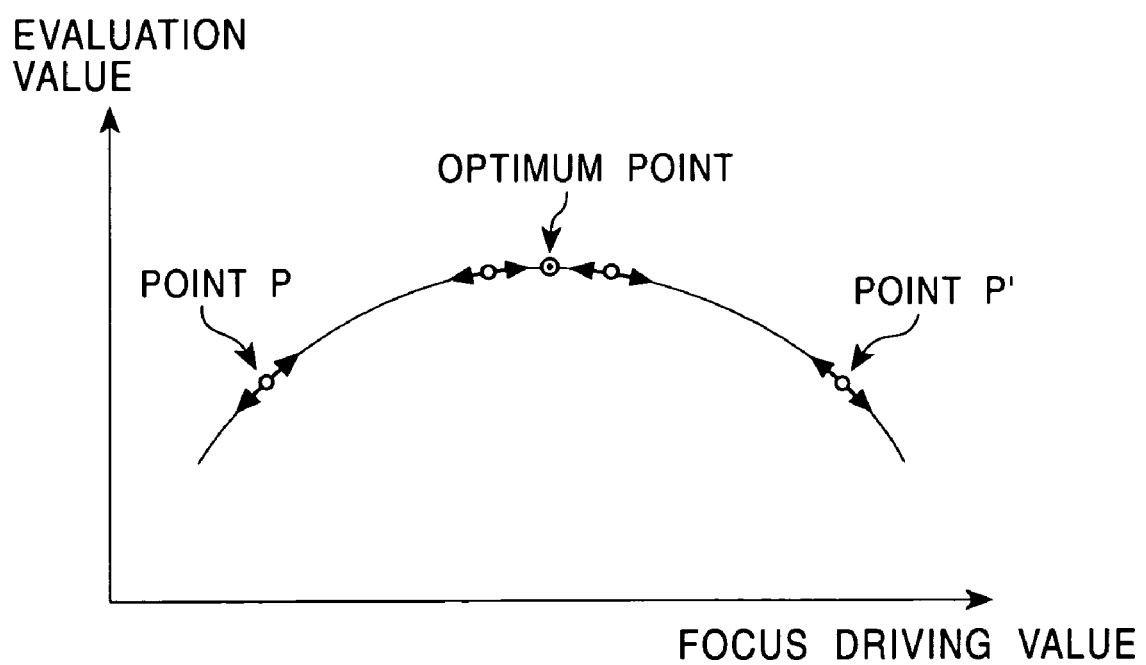
FIG. 7 is a view illustrating a change in evaluation value (envelope amplitude) with respect to the focus position and a product detection.

On the other hand, the analysis and the parameter value change with respect to the focus position are made as follows. With reference to FIG. 7, the envelope amplitude as an evaluation value has an optimum point with respect to the focus position. Such an evaluation function has small sensitivity in the vicinity of the optimum point. Departing from the optimum point the sensitivity of the evaluation function is increased and a proper direction can be easily detected. The sensitivity analysis is made by product detection utilizing such a feature.

Figure 8:
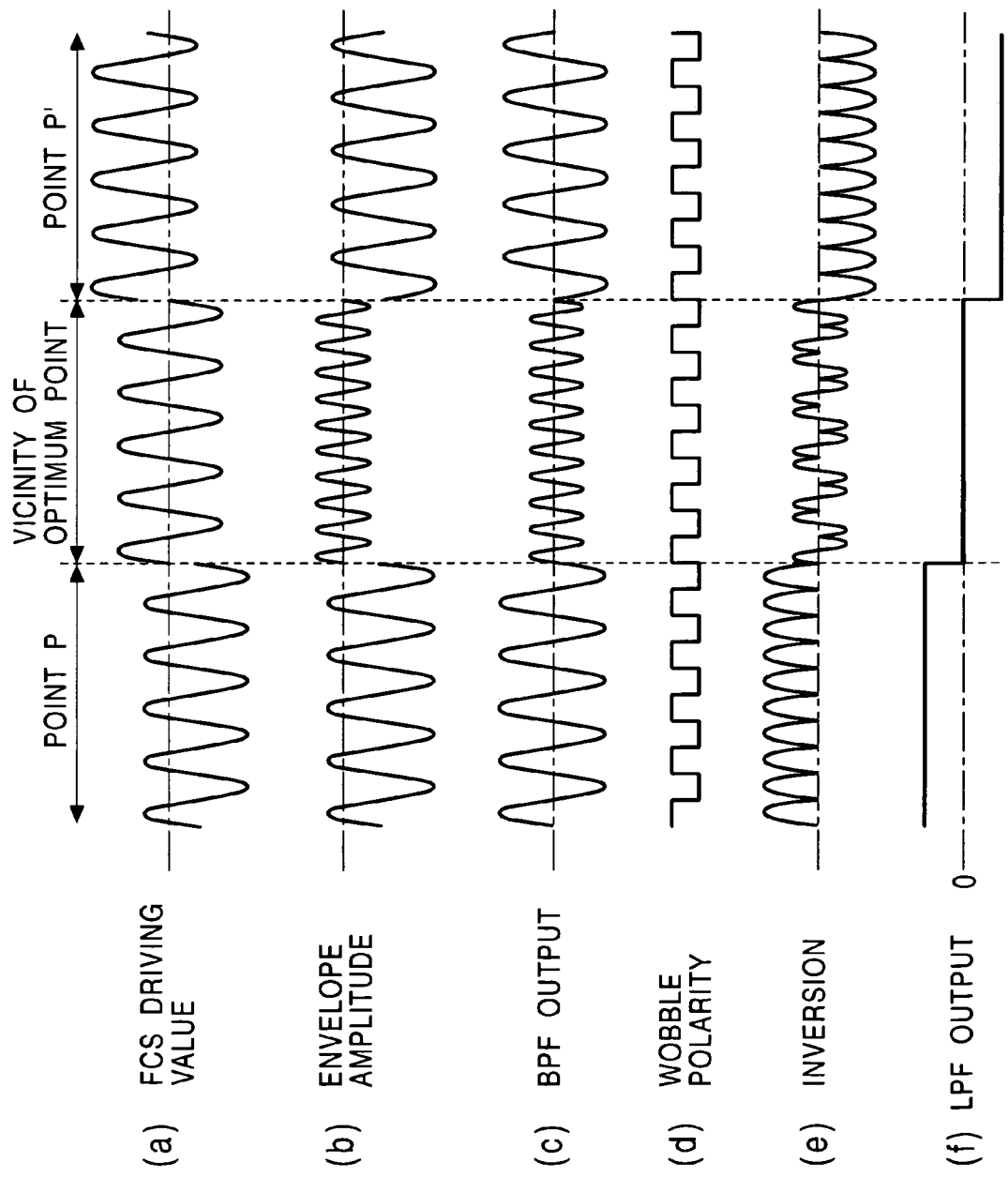
FIG. 8 is a view schematically illustrating an analyzing method with respect to the envelope amplitude shown in FIG. 7.

FIG. 8 is a view for schematically illustrating such an analysis method. FIG. 8 shows signals when the focus position shown in FIG. 7 is located at a minus point (point P) and a plus point (point P') from an optimum point and a point in the vicinity of the optimum point. A focus disturbance signal of a sine wave is applied to a driving value (FCS driving value, (a) of FIG. 8) of the objective lens 14. The focus position is wobbled in accordance with the disturbance signal, and the envelope amplitude is obtained as shown in (b) of FIG. 8. The amplitude is larger in the vicinity of the optimum point, and an amplitude variation due to the disturbance signal is small. Further, the amplitude at the point P' is wobbled in a phase reverse to that of the disturbance signal. A wobble frequency component ((c) of FIG. 8) is extracted from the envelope amplitude signal by a band pass filter (BPF), and is inverted ((e) of FIG. 8) in accordance with wobble polarity ((d) of FIG. 8). Then, a low frequency component ((f) of FIG. 8) is extracted by a low pass filter (LPF). The direction and magnitude of a focus driving amount are changed on the basis of positive and negative polarities of an output signal of the LPF and its magnitude.

Figure 9:
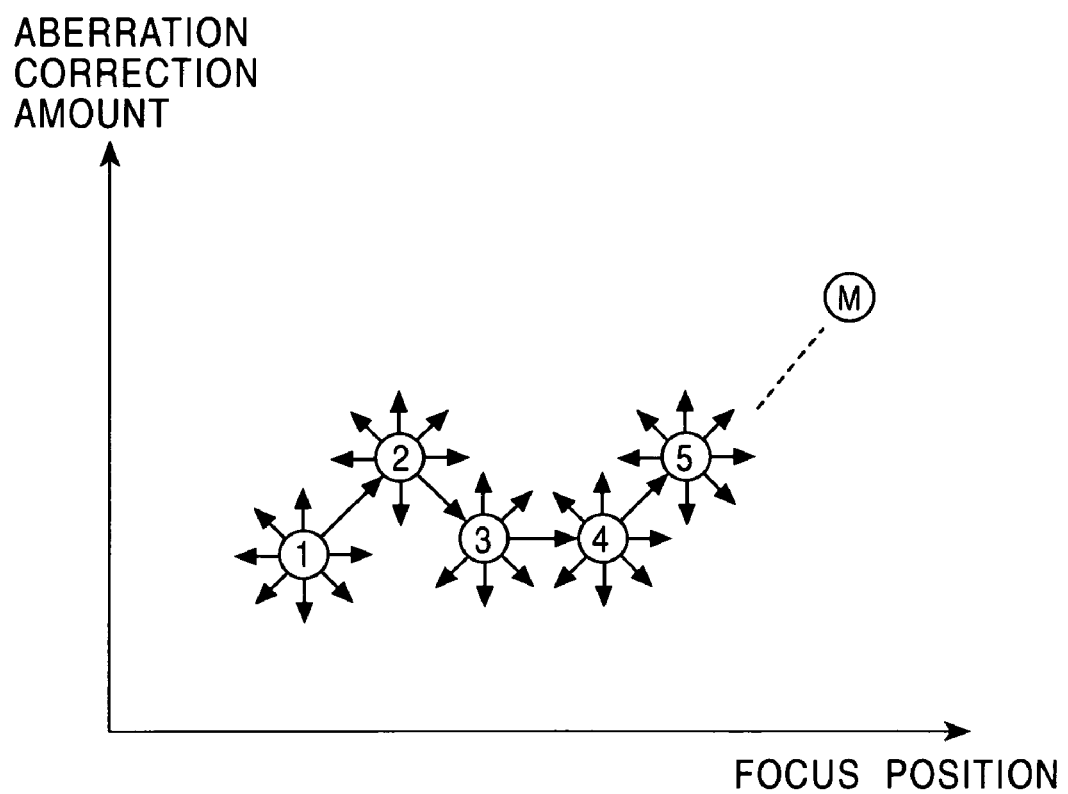
FIG. 9 is a view schematically illustrating a following route in the two-dimensional 8-direction search according to the first embodiment of the present invention.

The steps S22 to S23 are repeatedly executed until it is determined that the search is terminated (step S24). Thus, the optimum points of the focus position and the aberration correction amount are searched. FIG. 9 is a view schematically showing a route or trace in such a search. The sensitivity analysis is made at a search starting position (a first position: "1"), and both the focus position and the aberration correction amount are increased on the basis of the analysis result to reach a second position "2". Then, the focus position is increased and the aberration correction amount is reduced via a similar step to that at the second position to reach a third position "3". Similar steps are repeatedly executed so that the focus position and the aberration correction amount reaches an optimum position or point "M". For example, the determination (step S24) as to whether the evaluation value (envelope amplitude) is optimum or not can be discriminated by the determination as to whether or not a change in the evaluation value due to a change in the parameter values (the focus position and the aberration correction amount) is equal to or smaller than a predetermined value. When it is determined that the search is terminated, it is returned to the focus/aberration correction routine of FIG. 2.

In the focus/aberration correction routine, normal servo control is executed while the evaluation value is obtained (step S13). The controller 31 determines whether the multidimensional search is required or not on the basis of the obtained evaluation value (step S14). When it is determined that the multidimensional search is required, it proceeds to the step S12 and the above multidimensional search is executed (step S13). On the contrary, when it is determined that no multidimensional search is required, it is further determined whether the control is continued or not (step S15). When it is determined that the control is continued, it proceeds to the step S14. On the contrary, when no control is continued, this routine is escaped. According to the embodiment, the sensitivity analysis and the parameter value change are simultaneously made for a plurality of parameters so that a search time is short.

As described above, there is a problem in the prior art that it is difficult to optimize an entire system by individual adjustment and correction. According to the present invention, there is provided a recording/reproducing apparatus in which the problem is solved. The apparatus, therefore, is capable of optimizing both the focus adjustment and the aberration correction.

Second Embodiment

Figure 10:
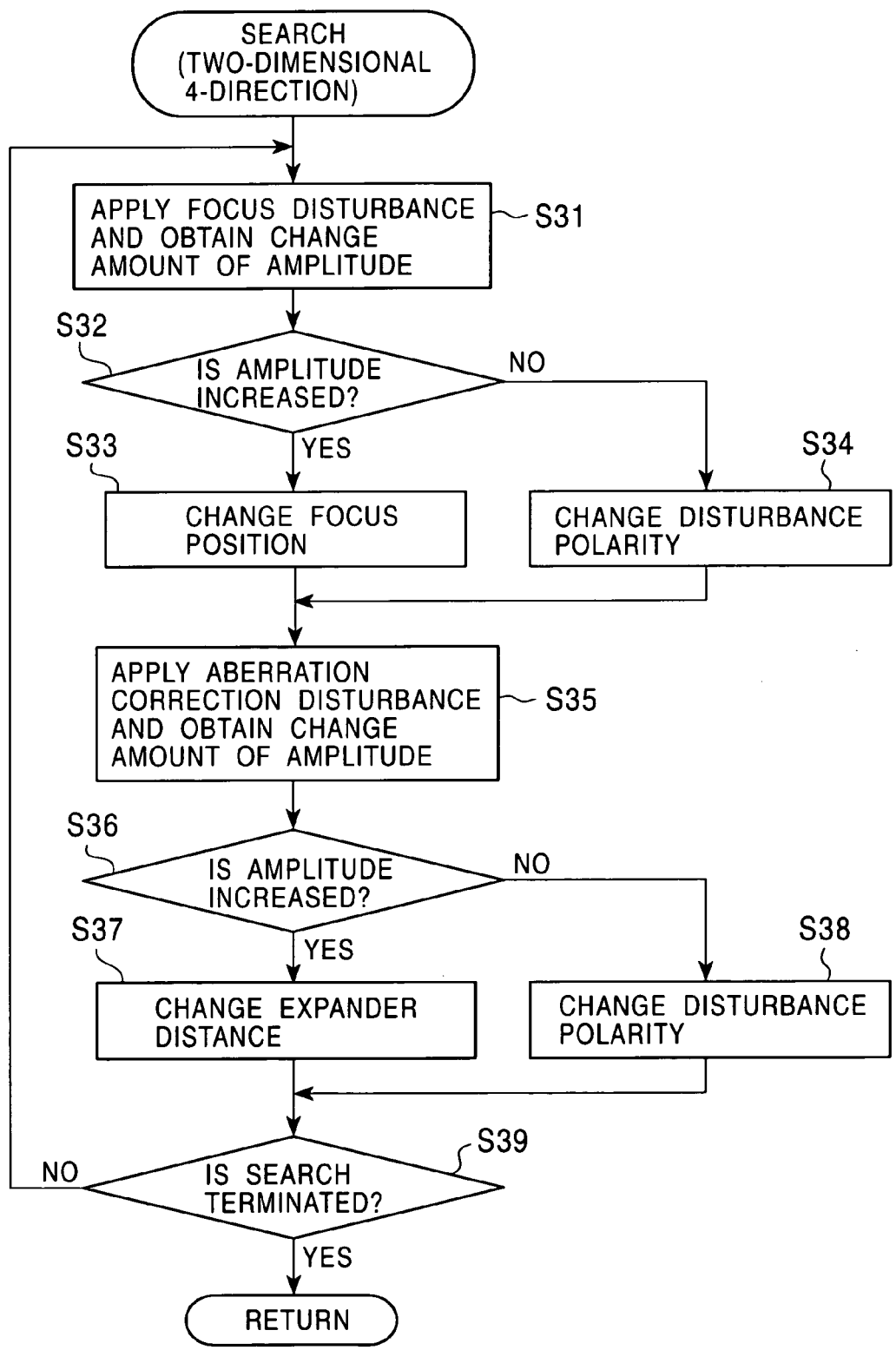
FIG. 10 is a flow chart showing a search operation of focus/aberration correction optimization according to a second embodiment of the present invention.

FIG. 10 is a flow chart showing a search operation of the focus/aberration correction optimization according to a second embodiment of the present invention. Similar to the first embodiment, for convenience of the explanation, description will be made for an example in which the aberration correction and the focus search are performed. The configuration of the recording/reproducing apparatus 10 is similar to that in the first embodiment.

In this embodiment, a focus disturbance signal (FCS-DIS) and an aberration correction disturbance signal (ABR-DIS) are alternately applied to perform optimal control.

Figure 11:
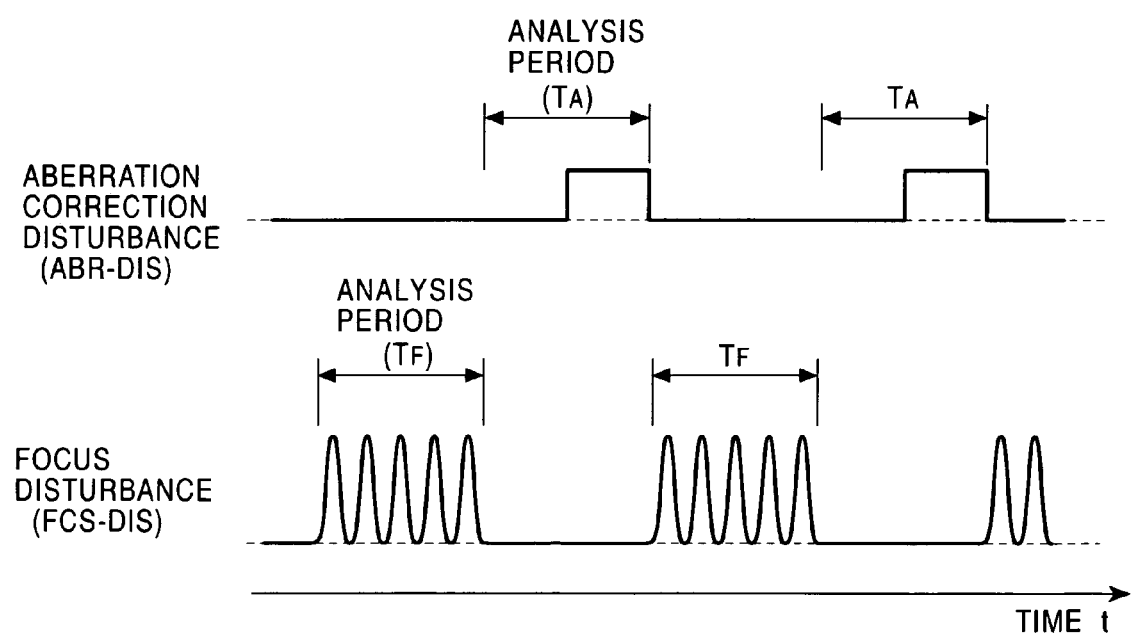
FIG. 11 is a view showing a focus disturbance signal (FCS-DIS) and an aberration correction disturbance signal (ABR-DIS) according to the second embodiment of the present invention.

The focus disturbance signal (FCS-DIS) is supplied to the actuator driver 25 for operating the objective lens 14 so that the focusing position of the objective lens 14 is wobbled. As shown in FIG. 11, the amplitude wobble of a sine wave shape is applied for only a sensitivity analysis period ($T_F$) by such a focus disturbance signal (FCS-DIS), and a change amount of the envelope amplitude (evaluation value) due to the application of the disturbance signal is obtained (step S31). Then, it is determined whether the envelope amplitude is increased or not (step S32). When the envelope amplitude is increased, disturbance polarity is appropriate so that the focus position is changed by operating the actuator driver 25 (step S33). On the contrary, when no envelope amplitude is increased, the disturbance polarity is inverted without changing the focus position (step S34).

Then, the aberration correction disturbance signal (ABR-DIS) is supplied to the aberration correction driver 26 and the aberration correction amount is wobbled. As shown in FIG. 11, similar to the first embodiment, the aberration correction disturbance signal (ABR-DIS) is a binary rectangular wave signal, i.e., a DC-like step signal synchronized with a rotating frequency of the optical disc 11. However, the sensitivity analysis period ($T_A$) of the aberration correction is provided within a time period during which the focus disturbance signal (FCS-DIS) is not applied, and the disturbance signal of a step shape is applied during the analysis period ($T_A$). A change amount of the envelope amplitude (evaluation value) due to the application of the disturbance signal is obtained (step S35). Then, it is determined whether the envelope amplitude is increased or not (step S36). When the envelope amplitude is increased, the disturbance polarity is proper so that the expander distance is changed and the aberration correction amount is changed by operating the aberration correction driver 26 (step S37). On the contrary, when no envelope amplitude is increased, the disturbance polarity is inverted without changing the expander distance (step S38).

Figure 12:
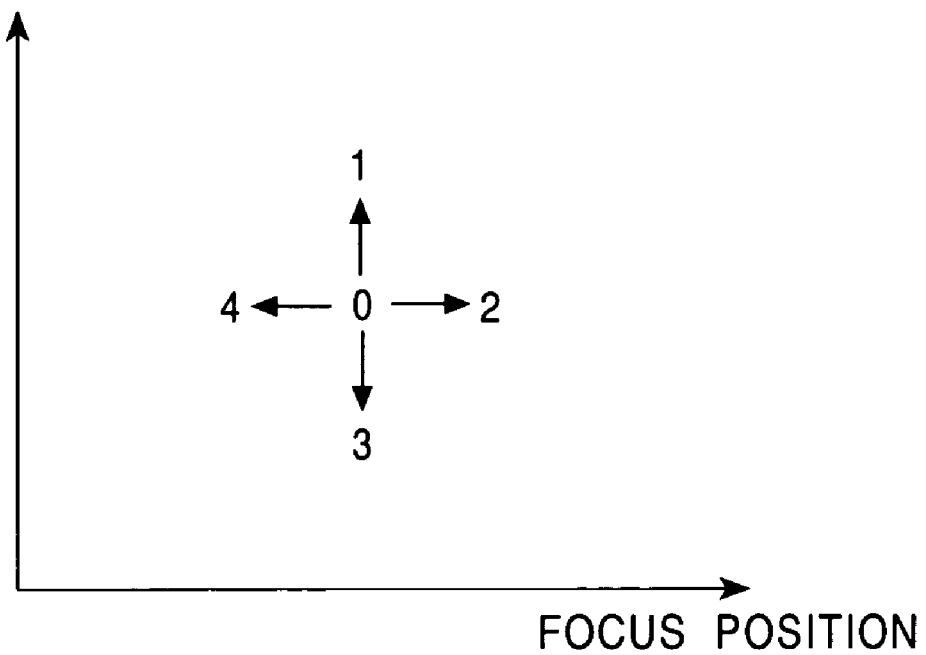
FIG. 12 is a view schematically showing the direction of a two-dimensional 4-direction search according to the second embodiment of the present invention.

FIG. 12 schematically shows a search direction in the procedures of steps S31 to S38. The sensitivity analysis is alternately made with respect to each of the focus position and the aberration correction amount. The parameter values are alternately changed on the basis of the analysis result. In this case, each parameter value is increased, decreased or unchanged. Accordingly, a 4-direction search (or 5-direction search when including "0" in which each of the parameter values is unchanged) is performed as shown by arrows 1–4 in FIG. 12. This search is called a "two-dimensional 4-direction search".

Figure 13:
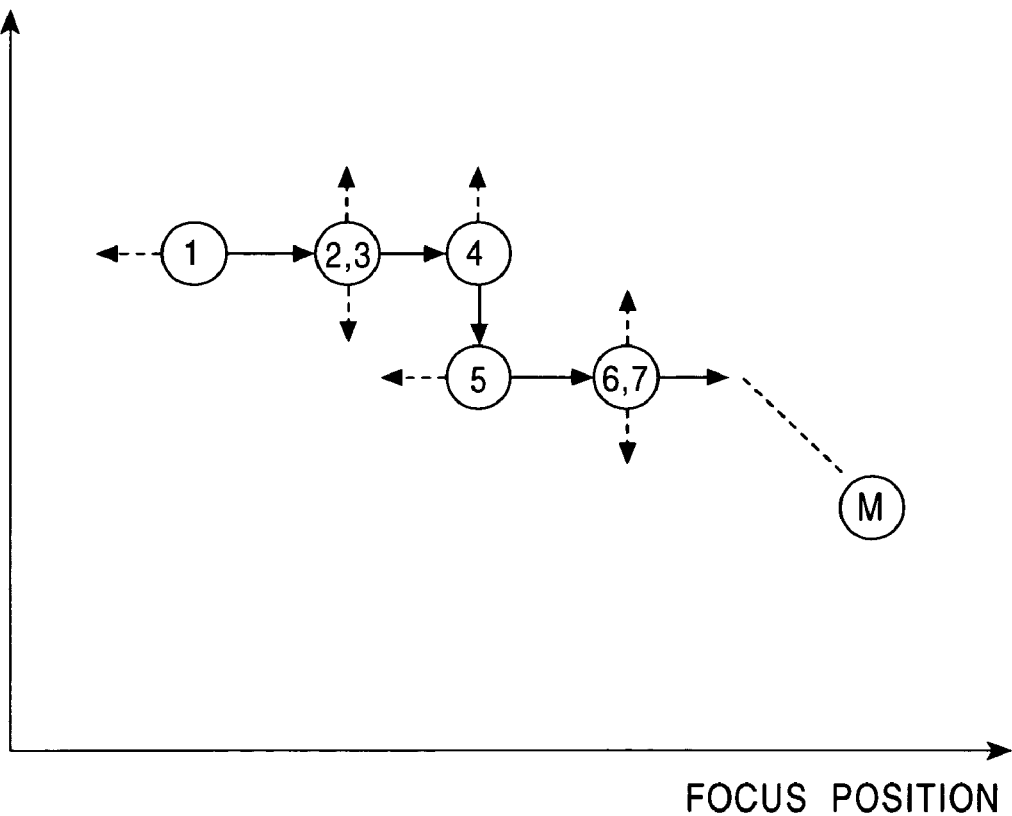
FIG. 13 is a view schematically showing a following route in the two-dimensional 4-direction search according to the second embodiment of the present invention.

The steps S31 to S38 are repeatedly executed until it is determined that the search is terminated (step S39). Thus, optimum points of the focus position and the aberration correction amount are searched. FIG. 13 is a view schematically showing the search route. The sensitivity analysis with respect to the focus position in a search starting position (first position: "1") is made, and the focusing position is increased on the basis of the analysis result to reach a second position. Then, the sensitivity analysis with respect to the aberration correction amount is made in the second position "2". At the second position, a disturbance of polarity for increasing the aberration correction amount is applied. When the amplitude is decreased in the sensitivity analysis, the disturbance polarity is inverted (third position "3") and a disturbance of polarity for reducing the aberration correction amount is applied in the next sensitivity analysis. Accordingly, it proceeds to the search with respect to the focus position without changing the aberration correction amount in this position. The sensitivity analysis with respect to the focus position is made and the focus position is increased on the basis of the analysis result and reaches a fourth position "4". Then, at the fourth position, as mentioned above, an aberration correction disturbance of polarity reverse to that in the previous position is applied and the aberration correction amount is decreased on the basis of the analysis result to reach a fifth position "5". Similar steps are repeatedly executed to reach an optimum point "M".

In the prior art, after an adjustment or a correction with respect to one parameter of the focus position and the aberration correction amount is terminated, the adjustment or the correction with respect to the other parameter is made. In this embodiment, the focus disturbance signal and the aberration correction disturbance signal are alternately applied, and the focus position and the aberration correction amount are alternately changed on the basis of the evaluation value obtained by the application. A plurality of parameters are simultaneously optimized concurrently or in parallel with each other by repeatedly executing such a procedure. Since the sensitivity analysis is alternately made with respect to the plurality of parameters, the sensitivity analysis is easily made.

As described above in detail, in accordance with the present invention, multidimensional optimization of the plurality of parameters can be performed. Accordingly, it is possible to provide a recording/reproducing apparatus of high performance which solves the problem of being unable to optimize an entire system by individual optimization of the parameters and is capable of optimizing both the focus control and the aberration correction.

In the above embodiments, the description is made for the cases in which the search is executed while the evaluation value is monitored during the recording or reproducing operation of the recording/reproducing apparatus 10. However, the search can be made in suitable timing. For example, the search may be executed only at a start time of the recording or reproducing operation, or may be executed at any time irrespective of the evaluation value. Further, the search may be executed every time the focus position is changed (i.e., focus jump) between recording tracks, or between recording layers in a multilayer disc.

In the above-described search operation, it is not necessary to set the driving amount constant for the focus position and/or the aberration correction amount after the sensitivity analysis is made. A procedure for promoting convergence of the search operation may be adopted, for example, by suitably changing the driving amount on the basis of the evaluation value obtained by the sensitivity analysis. For example, the driving amount may be changed in accordance with the amount of the evaluation value change with respect to the disturbance.

Further, the case using a rectangular wave disturbance signal synchronized with the rotation of the disc is described as an example. However, disturbance signals of various shapes can be used. Further, a disturbance signal having a period corresponding to a predetermined rotation angle of the disc can be used, and the synchronization with the rotation of the disc is not necessarily required.

Further, the case using the envelope amplitude as the evaluation value is described as an example. However, for example, it is possible to utilize various characteristic values such as a jitter amount, an error rate and a modulation index.

Further, the case utilizing the FG pulse signal corresponding to the spindle rotation angle is described as an example.

However, for example, it is possible to utilize a clock signal generated by providing a clock circuit.

Further, the multidimensional search can be made by modifying the present invention to a device having a servo control mechanism including a tracking servo, a tilt servo, a sled servo or a spindle servo, etc. in addition to the focus servo control.

Numeric values shown in the above embodiments are shown as an example. The period of the disturbance signal, the frequency, the sensitivity analysis period may be suitably changed in accordance with a type of a disc used, an optical element, an optical system, etc. The above embodiments can be applied by suitable modification or combination.

As can be seen from the above description, in accordance with the present invention, it is possible to provide a recording/reproducing apparatus of high performance which is capable of optimizing both the focus control and the aberration correction.

The invention has been described with reference to the preferred embodiments thereof. It should be understood by those skilled in the art that a variety of alterations and modifications may be made from the embodiments described above. It is therefore contemplated that the appended claims encompass all such alterations and modifications.

This application is based on Japanese Patent Application No. 2001-144769 which is hereby incorporated by reference.

What is claimed is:

1. A recording/reproducing apparatus for recording and/or reproducing information data by irradiating a light beam to a recording medium, and comprising:
    an optical pickup including an objective lens for converging said light beam, an actuator for operating said objective lens, an aberration correction element for correcting aberration caused in said reflected light beam, and a detector for generating a reading signal by receiving the reflected light beam from said recording medium;
    a servo control section for performing focus servo control by operating said actuator;
    an aberration correction driver for performing the aberration correction by operating said aberration correction element;
    a disturbance signal generator for generating a focus disturbance signal for wobbling a focusing position of said objective lens, and an aberration correction disturbance signal having a period different from that of said focus disturbance signal and wobbling an aberration correction amount of said aberration correction element; and
    a controller for adjusting said focusing position and said aberration correction amount on the basis of a change in a predetermined characteristic value of said reading signal when said focus disturbance signal and said aberration correction disturbance signal are simultaneously applied.

2. A recording/reproducing apparatus according to claim 1, wherein at least one of said focus disturbance signal and said aberration correction disturbance signal has a period corresponding to a predetermined rotation angle of said recording medium.

3. A recording/reproducing apparatus according to claim 1, wherein at least one of said focus disturbance signal and said aberration correction disturbance signal has a period corresponding to a predetermined rotation speed of said recording medium.

4. A recording/reproducing apparatus according to claim 3, wherein at least one of said focus disturbance signal and said aberration correction disturbance signal is a rectangular wave signal alternately changed every predetermined rotation of said recording medium.

5. A recording/reproducing apparatus according to claim 1, wherein said servo control section further controls a tracking position of said light beam, and said disturbance signal generator generates said focus disturbance signal and a tracking disturbance signal having a period different from that of said focus disturbance signal, and said controller adjusts said focusing position, said aberration correction amount and said tracking position on the basis of the change in the predetermined characteristic value when said tracking disturbance signal is applied simultaneously with said focus disturbance signal and said aberration correction disturbance signal.

6. A recording/reproducing apparatus according to claim 1, wherein said servo control section further performs correction control of a tilt angle of said light beam, and said disturbance signal generator generates said focus disturbance signal and a tilt correction disturbance signal having a period different from that of said focus disturbance signal, and said controller adjusts said focusing position, said aberration correction amount and said tilt angle on the basis of the change in the predetermined characteristic value when said tilt correction disturbance signal is applied simultaneously with said focus disturbance signal and said aberration correction disturbance signal.

7. A recording/reproducing apparatus according to claim 1, wherein said predetermined characteristic value includes any one of a signal amplitude amount, a jitter amount and an error rate amount.

8. A recording and/or reproducing apparatus for recording and/or reproducing information data by irradiating a light beam to a recording medium, and comprising:
    an optical pickup including an objective lens for converging said light beam, an actuator for operating said objective lens, an aberration correction element for correcting aberration caused in said reflected light beam, and a detector for generating a reading signal by receiving the reflected light beam from said recording medium;
    a servo control section for performing focus servo control by operating said actuator;
    an aberration correction driver for performing the aberration correction by operating said aberration correction element;
    a disturbance signal generator for generating a focus disturbance signal for wobbling a focusing position of said objective lens, and an aberration correction disturbance signal for wobbling a correcting amount of said aberration correction element, said aberration correction disturbance signal having a period different from that of said focus disturbance signal;
    a calculator for obtaining a predetermined characteristic value of said reading signal while said focus disturbance signal and said aberration correction disturbance signal are simultaneously or alternately applied, to calculate each of changing values for said focusing position and said correcting amount on the basis of a change in the obtained characteristic value; and
    a controller for simultaneously or alternately changing said focusing position and said correcting amount in accordance with each of the changing values to control said predetermined characteristic value so as to be an optimum value.

9. A recording and/or reproducing apparatus according to claim 8,
wherein said disturbance signal generator generates said focus disturbance signal and said aberration correction disturbance signal such that at least one of said focus disturbance signal and said aberration correction disturbance signal has a period corresponding to a predetermined rotation angle of said recording medium.

10. A recording and/or reproducing apparatus according to claim 8, wherein said disturbance signal generator generates said focus disturbance signal and said aberration correction disturbance signal such that at least one of said focus disturbance signal and said aberration correction disturbance signal has a period corresponding to a predetermined rotation speed of said recording medium.

11. A recording and/or reproducing apparatus according to claim 8, wherein when said focus disturbance signal is applied simultaneously with said aberration correction disturbance signal, said focus disturbance signal includes a period during which said aberration correction disturbance signal is constant.

12. A recording and/or reproducing apparatus according to claim 8, wherein when said focus disturbance signal is applied alternately with said aberration correction disturbance signal, said aberration correction disturbance signal includes a period during which said focus disturbance signal is not applied.

* * * * *